US012484706B2

(12) United States Patent
Chunglo

(10) Patent No.: US 12,484,706 B2
(45) **Date of Patent: *Dec. 2, 2025**

(54) MATTRESS ASSEMBLIES INCLUDING AT LEAST ONE ENCAPSUALTED PANEL INCLUDING A HEAT ABSORBING MATERIAL

(71) Applicant: Dreamwell, Ltd., Doraville, GA (US)

(72) Inventor: Christopher F. Chunglo, Marietta, GA (US)

(73) Assignee: DREAMWELL, LTD., Doraville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,888

(22) Filed: Jan. 14, 2020

(65) Prior Publication Data

US 2021/0212474 A1 Jul. 15, 2021

(51) Int. Cl.

| | |
|---|---|
| ***A47C 21/04*** | (2006.01) |
| ***A47C 21/06*** | (2006.01) |
| ***A47C 27/08*** | (2006.01) |
| ***A47C 27/14*** | (2006.01) |
| ***A47C 27/15*** | (2006.01) |
| ***A47C 27/22*** | (2006.01) |
| ***B68G 7/05*** | (2006.01) |
| ***B68G 7/10*** | (2006.01) |

(52) U.S. Cl.

CPC ............ *A47C 21/046* (2013.01); *A47C 21/06* (2013.01); *A47C 27/088* (2013.01); *A47C 27/148* (2013.01); *A47C 27/15* (2013.01); *A47C 27/22* (2013.01); *B68G 7/05* (2013.01); *B68G 7/10* (2013.01)

(58) Field of Classification Search

CPC ..... A47C 21/046; A47C 21/06; A47C 27/002; A47C 27/088; A47C 27/148; A47C 27/15; A47C 27/22; A47C 31/105; B68G 7/05; B68G 7/10

See application file for complete search history.

(56) References Cited

U.S. PATENT DOCUMENTS

| | | | | | |
|---|---|---|---|---|---|
| 5,277,915 | A | * | 1/1994 | Provonchee | B01J 20/28028 428/394 |
| 5,362,834 | A | * | 11/1994 | Schapel | C08G 18/6677 528/85 |
| 5,633,286 | A | * | 5/1997 | Chen | A63H 33/185 524/474 |

(Continued)

FOREIGN PATENT DOCUMENTS

| | | | | |
|---|---|---|---|---|
| GB | 2113262 A | | 8/1983 | |
| JP | 7370980 B2 | * | 10/2023 | A47C 21/044 |

(Continued)

OTHER PUBLICATIONS

International Search Report and Written Opinion for Application No. PCT/US21/013344 mailed Jun. 28, 2021, 17 pages.

*Primary Examiner* — Myles A Throop
(74) *Attorney, Agent, or Firm* — CANTOR COLBURN LLP

(57) ABSTRACT

Mattress assemblies including at least one encapsulated panel including a layer of fibers and/or foam saturated with a heat absorbing material. The layer is completely encapsulated with a liquid impermeable and flexible material. The heat absorbing material is not microencapsulated.

11 Claims, 1 Drawing Sheet

(56) References Cited

U.S. PATENT DOCUMENTS

| | | | | |
|---|---|---|---|---|
| 5,636,395 | A * | 6/1997 | Serda | A47C 27/18 5/655.5 |
| 5,722,482 | A * | 3/1998 | Buckley | F28D 20/023 428/317.9 |
| 6,809,143 | B2 * | 10/2004 | Nowak | C08G 18/4816 524/492 |
| 7,690,096 | B1 | 4/2010 | Gladney et al. | |
| 10,687,632 | B1 * | 6/2020 | Stanley | H01L 23/3733 |
| 11,793,322 | B2 * | 10/2023 | Pearce | A47C 27/22 |
| 12,167,795 | B2 * | 12/2024 | Chunglo | A47C 21/048 |
| 2003/0109908 | A1 * | 6/2003 | Lachenbruch | A47C 27/148 607/96 |
| 2004/0211005 | A1 * | 10/2004 | Kuo | A47C 27/12 5/655.5 |
| 2006/0080778 | A1 * | 4/2006 | Chambers | A47C 27/082 5/652.2 |
| 2014/0165292 | A1 | 6/2014 | Gladney | |
| 2015/0067967 | A1 * | 3/2015 | Tyree | A47C 27/144 5/691 |
| 2016/0157631 | A1 * | 6/2016 | Milnes | A47C 27/148 5/691 |
| 2017/0020299 | A1 * | 1/2017 | Valenta | A47C 27/002 |
| 2017/0035211 | A1 * | 2/2017 | Alletto, Jr. | A47C 27/062 |
| 2018/0296002 | A1 * | 10/2018 | Rothbard | A47C 27/15 |
| 2019/0017200 | A1 * | 1/2019 | Alletto, Jr. | A47C 31/006 |
| 2019/0038040 | A1 * | 2/2019 | Mason | A47C 27/085 |
| 2019/0246813 | A1 * | 8/2019 | Peterson | A47D 5/00 |
| 2020/0260882 | A1 * | 8/2020 | Chunglo | A47C 27/148 |

FOREIGN PATENT DOCUMENTS

| | | | | |
|---|---|---|---|---|
| WO | WO-2005004779 | A1 * | 1/2005 | A47C 21/046 |
| WO | 2019036559 | A1 | 2/2019 | |

* cited by examiner

MATTRESS ASSEMBLIES INCLUDING AT LEAST ONE ENCAPSUALTED PANEL INCLUDING A HEAT ABSORBING MATERIAL

BACKGROUND

The present disclosure generally relates to mattress assemblies including at least one panel and/or layer including heat absorbing material.

Some heat absorbing materials can include a phase change, which is a term used to describe a reversible process in which a solid turns to a liquid or a gas. The process of phase change from a solid to a liquid requires energy to be absorbed by the solid. When a phase change material ("PCM") liquefies, energy is absorbed from the immediate environment as it changes from the solid to the liquid. In contrast to a sensible heat storage material, which absorbs and releases energy essentially uniformly over a broad temperature range, a phase change material absorbs and releases a large quantity of energy in the vicinity of its melting/freezing point. Therefore, a PCM that melts below body temperature would feel cool as it absorbs heat, for example, from a body. Phase change materials, therefore, include materials that liquefy (melt) to absorb heat and solidify (freeze) to release heat. The melting and freezing of the material typically take place over a narrow temperature range.

PCMs have been used in various applications ranging from household insulation to clothing. Dispersal in preformed foams is expensive, involves an additional step after formation of the foam, and typically does not uniformly distribute the PCMs throughout foams greater than one inch in thickness. In these types of applications, the PCM is microencapsulated. Typically, the PCM material itself is a relatively inexpensive long chain hydrocarbon that is subsequently microencapsulated. Exemplary long chain hydrocarbons include octadecane, nonadecane, icosane, heptadecance, and the like. These materials have low melting point temperatures. However, as noted above, the microencapsulation process dramatically increases the price of the PCM. As one decreases the overall size of the microencapsulated PCM, the net volume of the PCM within the microencapsulated PCM significantly decreases whereas the volume taken up by the capsule increases.

BRIEF SUMMARY

Disclosed herein are mattress assemblies and processes of manufacturing a mattress assembly. In one or more embodiments, the mattress assembly includes at least one layer proximate to a sleeping surface of the mattress assembly spanning at least a portion of the length and/or width of the sleeping surface. The at least one layer includes an encapsulated panel including a layer of liquid permeable fibers saturated with a heat absorbing material, wherein the layer is completely encapsulated with a liquid impermeable and flexible material.

In one or more embodiments, the mattress assembly includes at least one layer proximate to a sleeping surface of the mattress assembly spanning at least a portion of the length and/or width of the sleeping surface. The at least one layer includes an encapsulated panel including a layer of foam saturated with a heat absorbing material, wherein the layer is completely encapsulated with a liquid impermeable and flexible material.

In one or more embodiments, the process of manufacturing a mattress assembly includes providing a layer of foam and/or fibers. The layer is encapsulated with a liquid impermeable and flexible material including at least one opening. The layer is saturated by injecting a liquid or liquified heat absorbing material through the at least one opening. The at least one opening is sealed to form an encapsulated panel including the heat absorbing material. The encapsulated panel is placed within the mattress assembly at a location proximate to a sleeping surface.

In one or more embodiments, the process of manufacturing a mattress assembly includes providing a layer of foam and/or fibers. The layer of foam and/or fibers is saturated with a liquified heat absorbing material. The saturated layer of foam and/or fibers is cooled to change a phase of the liquified heat absorbing material to a solid. The saturated layer of foam and/or fibers is sandwiched between first and second layers of a flexible film and the edges sealed to form an encapsulated panel. The encapsulated panel is placed within the mattress assembly at a location proximate to a sleeping surface.

The disclosure may be understood more readily by reference to the following detailed description of the various features of the disclosure and the examples included therein.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. ("FIG.") 1 schematically illustrates a cross sectional view of an encapsulated fiber panel in accordance with one or more embodiments of the present invention.

The diagrams depicted herein are illustrative. There can be many variations to the diagram or the operations described therein without departing from the spirit of the invention. All of these variations are considered a part of the specification.

DETAILED DESCRIPTION

Disclosed herein are an encapsulated panel including a heat absorbing material and mattress assemblies including the same. As will be described in greater detail herein, the encapsulated panel is generally formed of a resilient permeable material that is saturated with the heat absorbing material in liquid form, e.g., a phase change material, wherein the panel is then completely encapsulated with a liquid impervious and flexible material. In one or more embodiments, mattress assemblies include at least one or these encapsulated panels at or proximate to a sleeping surface and may span the length and/or width of the sleeping surface or a portion thereof to define one or more zones. The one or more zones can be the same or a different encapsulated panel including the heat absorbing material depending on location on the sleeping surface.

The resilient permeable material saturated with the heat absorbing material can be a fiber, a foam or a combination thereof. Suitable resilient permeable materials will be described in greater detail below but are generally substantially inert and dimensionally stable to the heat absorbing material.

Figure 1:
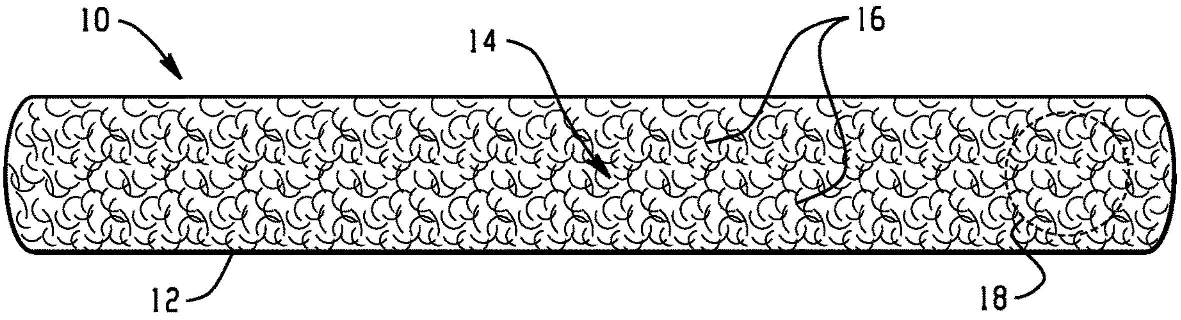
Figure 2:
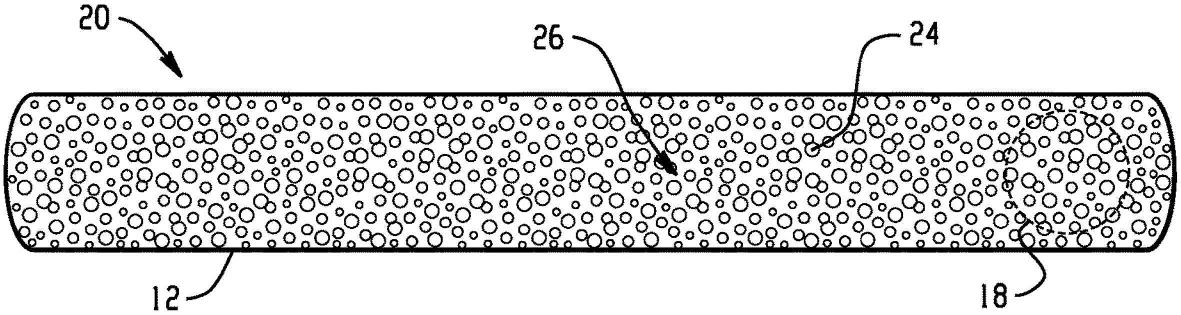
FIG. 2 schematically illustrates a cross sectional view of an encapsulated foam panel in accordance with one or more embodiments of the present invention.

FIGS. 1 and 2 depict an encapsulated panel formed of resilient permeable fibers and foam, respectively in accordance with in or more embodiments of the present invention. In FIG. 1, an encapsulated fiber panel, generally designated by reference numeral 10, includes a layer 14 of fibers 16 saturated with a heat absorbing material, which is encapsulated in a flexible liquid impermeable material 12. The fibers can be randomly oriented, vertically oriented, or horizontally oriented depending on the desired feel of the panel. The fiber panel can include some free volume, i.e., air pockets, which can include a portion of the heat absorbing material.

In FIG. 2, an encapsulated foam panel 20 is depicted. A layer of foam 26 within the panel 20 has a free volume per unit area of at least 50%, wherein the free volume is defined by the pores and/or tortuous pathways 24 formed in the foam during the manufacture thereof. The pores and/or tortuous pathways in the foam contain the heat absorbing material. Similar to the encapsulated fiber panel described above, the encapsulated foam panel is encapsulated in the flexible liquid impermeable material 12.

During manufacture of the encapsulated panel, a layer of the fibers and/or foam is first encapsulated with the liquid impermeable material 12, which includes at least one opening 18. Liquid or liquified heat absorbing material is then injected through the opening 18 to provide the desired amount of saturation. For example, the heat absorbing material can be a phase change material that is heated above its transition temperature to form a liquid phase, which can then be injected as a liquid into the layer of fibers and/or foam. The liquid impermeable material contains the liquid or liquified heat absorbing material and prevents migration outside of the foam and/or fiber layer and into the rest of the mattress assembly. Depending on the material defining the resilient permeable material, the heat absorbing material wicks into and/or fills voids via capillary action. Once filled to the desired amount, the opening is sealed. Additional openings (not shown) may be utilized to provide venting during the filling step.

Alternatively, manufacture of a panel can include saturating the layer of fiber and/or foam with a desired amount of a phase change material at a temperature greater than a solid-liquid transition temperature. The layer of fibers of foam are then cooled below the transition temperature for a period of time effective to change the phase of the phase change material from a liquid to a solid. The layer is then sandwiched between two layers of a flexible film and sealed about the edges. It should be apparent that depending on the transition temperature the flexible film may not need to be liquid impermeable. Should the temperature of the layer of foam and/or fibers saturated with the phase change material in the manner described above be below the transition temperature during use in the mattress assembly, then the phase change material would remain in the solid phase yet still absorb significant amounts of heat. In this alternative method of manufacture, an opening would not be needed.

In the case of fibers, the fibers can be natural fibers and/or synthetic fibers. The use of natural fibers in bedding components is generally desirable due to the softness and durability associated with fibers as well as the absorption properties. Suitable fibers include, without limitation, polyester, polyolefins such as a polypropylene and polyethylene, cellulosic fibers, cotton, rayon, wool, silk, acetate, nylon, lyocell, flax, ramie, jute, angora, kenaf, elastomeric fibers and the like, and mixtures thereof.

The fibers may have varying diameter and denier, be hollow or solid, or may be crimped. Blending different types of fibers may further contribute to resiliency of the panel or layer.

Materials used for the foam may include, without limitation, polyurethane foams, latex foams including natural, blended and synthetic latex foams; polystyrene foams, polyethylene foams, polypropylene foam, polyether-polyurethane foams, and the like. Likewise, the foam can be selected to be viscoelastic or non-viscoelastic foams. Some viscoelastic foam materials are also temperature sensitive, thereby enabling the foam layer to change hardness/firmness based in part upon the temperature of the supported part, e.g., person. Unless otherwise noted, any of these foams may be open celled or a hybrid structure of open cell and closed cell. Likewise, the foams can be reticulated, partially reticulated or non-reticulated foams. The term reticulation generally refers to removal of cell membranes to create an open cell structure that is open to air and moisture flow.

In one or more embodiments, the hardness property of the foam layer or foam panel of the layers generally have an indention load deflection (ILD) of 6 to 25 pounds force for viscoelastic foams and an ILD of 7 to 55 pounds force for non-viscoelastic foams measured in accordance with ASTM D-3574 and/or ASTM D 3575. In one or more embodiments, the density of the foam panel or foam layer can generally range from about 1 to 2.5 pounds per cubic foot for non-viscoelastic foams and 1.5 to 8 pounds per cubic foot for viscoelastic foams.

As used herein, reference to the term "saturated" generally means that the resilient permeable material, the fibers and/or the foam, defining the panel or layer absorbs and/or contains the heat absorbing material. In the case of foams, saturation generally means that the heat absorbing material is contained in an amount exceeding fifty percent of the free volume per unit area of the foam, i.e., air space. In one or more embodiments, the foam containing the heat absorbing material is in an amount exceeding seventy percent of the free volume per unit area of the foam. In other embodiments, the foam material contains the heat absorbing material in an amount exceeding ninety percent of the free volume per unit area of the foam, and in still other embodiments, the soft permeable material contains the heat absorbing material in an amount of about one hundred percent or more of the free volume per unit area of the foam. In one or more embodiments, the material defining the foam can also absorb the heat absorbing material in addition to containing the heat absorbing material within the free volume per unit area of the foam. The amount of heat absorbing material added to the panel is generally dependent upon the amount of heat you want to absorb, which will determine how long the panel will have a cooling effect on the sleeper.

In the case of fibers, saturation generally refers to absorption of the heat absorbing material into the fibers themselves and/or wicked around the fiber and filling the voids between the fibers, i.e., similar to the foam panel, wherein the amount of heat absorbing material added is dependent on the amount of heat you want to absorb and how long you want the cooling effect to last.

The thickness of the encapsulated panel will generally depend on the fill percent of the heat absorbing material and the amount of material needed for the desired cooling effect. The fill percent can affect the feel of the encapsulated panel. The higher the fill percent the denser the feel the encapsulated panel will have. For example, a thin panel with a high fill percent will have a very dense feel whereas a thick panel with a lower fill rate will have a less dense feel and feel more like the fiber and/or foam that defines the layer. In one or more embodiments, the encapsulated panel including the heat absorbing material has a thickness less than one inch, and in one or more other embodiments, the encapsulated panel has a thickness less than three quarters of an inch, and in still one or more other embodiments, the encapsulated panel has a thickness less than one half inch.

In one or more embodiments, the heat absorbing material can be a phase change material. The phase change material is not intended to be limited to any particular phase change material and could be a phase change material that does not undergo a phase change during use by an end user of the mattress. Assembly. For example, the phase change transition temperature of the phase change material can be relatively high so that a phase change does not occur upon interaction with a user of the phase change material but can still absorb a considerable amount of heat. However, during manufacture of the encapsulated panel, the phase change material can have a transition temperature effective to provide a phase change to a liquid to provide a desired degree of saturation.

Phase change materials that can be incorporated in the resilient permeable material in accordance with various embodiments of the invention include a variety of organic and inorganic substances including paraffins; bio-phase change materials derived from acids, alcohols, amines, esters, and the like; salt hydrates; and the like. The particular phase change material or mixtures thereof are not intended to be limited.

Exemplary phase change materials include hydrocarbons (e.g., straight chain alkanes or paraffinic hydrocarbons, branched-chain alkanes, unsaturated hydrocarbons, halogenated hydrocarbons, and alicyclic hydrocarbons), bio-phase change materials derived from acids, alcohols, amines, esters, and the like, hydrated salts (e.g., calcium chloride hexahydrate, calcium bromide hexahydrate, magnesium nitrate hexahydrate, lithium nitrate trihydrate, potassium fluoride tetrahydrate, ammonium alum, magnesium chloride hexahydrate, sodium carbonate decahydrate, disodium phosphate dodecahydrate, sodium sulfate decahydrate, and sodium acetate trihydrate), waxes, oils such as coconut oil, rice oil and the like, fatty acids, fatty acid esters, dibasic acids, dibasic esters, 1-halides, primary alcohols, aromatic compounds, clathrates, semi-clathrates, gas clathrates, anhydrides (e.g., stearic anhydride), ethylene carbonate, polyhydric alcohols (e.g., 2,2-dimethyl-1,3-propanediol, 2-hydroxymethyl-2-methyl-1,3-propanediol, ethylene glycol, polyethylene glycol, pentaerythritol, dipentaerythritol, pentaglycerine, tetramethylol ethane, neopentyl glycol, tetramethylol propane, 2-amino-2-methyl-1,3-propanediol, monoaminopentaerythritol, diaminopentaerythritol, and tris (hydroxymethyl)acetic acid), polymers (e.g., polyethylene, polyethylene glycol, polyethylene oxide, polypropylene, polypropylene glycol, polytetramethylene glycol, polypropylene malonate, polyneopentyl glycol sebacate, polypentane glutarate, polyvinyl myristate, polyvinyl stearate, polyvinyl laurate, polyhexadecyl methacrylate, polyoctadecyl methacrylate, polyesters produced by polycondensation of glycols (or their derivatives) with diacids (or their derivatives), and copolymers, such as polyacrylate or poly(meth) acrylate with alkyl hydrocarbon side chain or with polyethylene glycol side chain and copolymers comprising polyethylene, polyethylene glycol, polyethylene oxide, polypropylene, polypropylene glycol, or polytetramethylene glycol), metals, and mixtures thereof.

The selection of the phase change material will typically be dependent upon a desired transition temperature for manufacture or for use thereof in a mattress assembly. For example, a phase change material having a transition temperature near room temperature may be desirable for mattress applications to maintain a comfortable temperature for a user.

A phase change material according to some embodiments of the invention may cab be selected to have a transition temperature ranging from about 22° to about 40° C., although lesser or greater transition temperatures can be used. In one or more other embodiments, the phase change material can have a transition temperature ranging from about 26° to about 30° C. With regard to paraffin phase change materials, the number of carbon atoms of a paraffinic hydrocarbon typically correlates with its melting point. For example, n-octacosane, which contains twenty-eight straight chain carbon atoms per molecule, has a melting point of 61.4° C. whereas n-tridecane, which contains thirteen straight chain carbon atoms per molecule, has a melting point of −5.5° C. According to an embodiment of the invention, n-octadecane, which contains eighteen straight chain carbon atoms per molecule and has a melting point of 28.2° C., is particularly desirable for mattress applications.

Other useful phase change materials include polymeric phase change materials having transition temperatures from about 22° to about 40° C. A polymeric phase change material may comprise a polymer (or mixture of polymers) having a variety of chain structures that include one or more types of monomer units. In particular, polymeric phase change materials may include linear polymers, branched polymers (e.g., star branched polymers, comb branched polymers, or dendritic branched polymers), or mixtures thereof. A polymeric phase change material may comprise a homopolymer, a copolymer (e.g., terpolymer, statistical copolymer, random copolymer, alternating copolymer, periodic copolymer, block copolymer, radial copolymer, or graft copolymer), or a mixture thereof. As one of ordinary skill in the art will understand, the reactivity and functionality of a polymer may be altered by addition of a functional group such as, for example, amine, amide, carboxyl, hydroxyl, ester, ether, epoxide, anhydride, isocyanate, silane, ketone, and aldehyde. Also, a polymer comprising a polymeric phase change material may be capable of crosslinking, entanglement, or hydrogen bonding in order to increase its toughness or its resistance to heat, moisture, or chemicals.

According to some embodiments of the invention, a polymeric phase change material may be desirable as a result of having a higher molecular weight, larger molecular size, or higher viscosity relative to non-polymeric phase change materials (e.g., paraffinic hydrocarbons). In addition to providing thermal regulating properties, a polymeric phase change material may provide improved mechanical properties (e.g., ductility, tensile strength, and hardness).

For example, polyethylene glycols may be used as the phase change material in some embodiments of the invention. The number average molecular weight of a polyethylene glycol typically correlates with its melting point. For instance, a polyethylene glycol having a number average molecular weight range of 570 to 630 (e.g., Carbowax 600) will have a melting point of 20° to 25° C., making it desirable for mattress applications. Further desirable phase change materials include polyesters having a melting point in the range of 22° to 40° C. that may be formed, for example, by polycondensation of glycols (or their derivatives) with diacids (or their derivatives).

According to some embodiments of the invention, a polymeric phase change material having a desired transition temperature may be formed by reacting a phase change material (e.g., an exemplary phase change material discussed above) with a polymer (or mixture of polymers). Thus, for example, n-octadecylic acid (i.e., stearic acid) may be reacted or esterified with polyvinyl alcohol to yield polyvinyl stearate, or dodecanoic acid (i.e., lauric acid) may be reacted or esterified with polyvinyl alcohol to yield polyvinyl laurate. Various combinations of phase change materials (e.g., phase change materials with one or more functional groups such as amine, carboxyl, hydroxyl, epoxy, silane, sulfuric, and so forth) and polymers may be reacted to yield polymeric phase change materials having desired transition temperatures.

Table 1 provides a list of exemplary commercially available phase change materials and the corresponding metal point (Tm) suitable for use in mattress applications described herein.

TABLE 1

| Material | Supplier | Type | Form | Melting point, Tm |
|---|---|---|---|---|
| 0500-Q28 BioPCM | Phase Change Energy Solutions | Functionalized BioPCM | Bulk, Macro-encapsulated | 28° C. (82° F.) |
| Pure Temp 28 | PureTemp LLC | Organic | Bulk | 28° C. (82° F.) |
| RT27 | Rubitherm GmbH | Organic | Bulk | 28° C. (82° F.) |
| Climsel C28 | Climator | Inorganic | Bulk | 28° C. (82° F.) |
| RT 30 | Rubitherm GmbH | Organic | Bulk | 28° C. (82° F.) |
| RT 28 HC | Rubitherm GmbH | Organic | Bulk | 28° C. (82° F.) |
| A28 | PlusICE | Organic | Bulk | 28° C. (82° F.) |
| MPCM 28 | Microtek | Organic | Micro-encapsulated | 28° C. (82° F.) |
| MPCM 28D | Microtek | Organic | Micro-encapsulated | 28° C. (82° F.) |
| Latest 29 T | TEAP | Inorganic | Bulk | 28° C. (82° F.) |
| 0500-Q29 BioPCM | Phase Change Energy Solutions | Functionalized BioPCM | Bulk, Macro-encapsulated | 29° C. (84° F.) |
| 29 $C^0$ Infinite R | Insolcorp | Inorganic | Macro-encapsulated | 29° C. (84° F.) |
| savE HS 29 | Pluss | Inorganic | Bulk | 29° C. (84° F.) |
| savE OM 29 | Pluss | Organic | Bulk | 29° C. (84° F.) |
| savE FS 29 | Pluss | Organic | Bulk | 29° C. (84° F.) |
| Pure Temp 29 | PureTemp LLC | Organic | Bulk | 29° C. (84° F.) |
| TH 29 | TEAP | Inorganic | Bulk | 29° C. (84° F.) |
| A29 | PlusICE | Organic | Bulk | 29° C. (84° F.) |
| PCM-HS29P | SAVENRG | Inorganic | Bulk | 29° C. (84° F.) |
| CrodaTherm ™ 29 | Croda International Plc | Organic | Bulk | 29° C. (84° F.) |
| 0500-Q30 BioPCM | Phase Change Energy Solutions | Functionalized BioPCM | Bulk, Macro-encapsulated | 30° C. (86° F.) |
| S30 | PlusICE | Inorganic | Bulk | 30° C. (86° F.) |
| savE OM 30 | Pluss | Organic | Bulk | 31° C. (88° F.) |
| savE FS 30 | Pluss | Organic | Bulk | 31° C. (88° F.) |
| RT 31 | Rubitherm GmbH | Organic | Bulk | 31° C. (88° F.) |
| 0500-Q32 BioPCM | Phase Change Energy Solutions | Functionalized BioPCM | Bulk, Macro-encapsulated | 32° C. (90° F.) |
| savE OM 32 | Pluss | Organic | Bulk | 32° C. (90° F.) |
| Climsel C32 | Climator | Inorganic | Bulk | 32° C. (90° F.) |
| S32 | PlusICE | Inorganic | Bulk | 32° C. (90° F.) |
| A32 | PlusICE | Organic | Bulk | 32° C. (90° F.) |
| PCM-OM32P | SAVENRG | Organic | Bulk | 32° C. (90° F.) |

Also, the phase change material according to one or more embodiments can have a latent heat that is at least about 40 Joules/gram (J/g), at least about 50 J/g in other embodiments, and at least about 60 J/g in still other embodiments. As used herein, the term "latent heat" can refer to an amount of heat absorbed or released by a substance (or mixture of substances) as it undergoes a transition between two states. Thermal energy can be stored or removed from a phase change material, and the phase change material typically can be effectively recharged by a source of heat or cold. By selecting an appropriate phase change material, a multi-component fiber can be designed for use in any one of numerous products.

The phase change material can include a mixture of two or more substances (e.g., two or more of the exemplary phase change materials discussed above). By selecting two or more different substances (e.g., two different paraffinic hydrocarbons) and forming a mixture thereof, a temperature stabilizing range can be adjusted over a wide range to extend the cooling effect over a longer period of time. For example, octadecane can be used as the primary phase change material to which a small amount of phase change material(s) having a lower carbon content (e.g., $C_{16}$, $C_{17}$) can be used to lower the melting point, which can make the mixture less hard at room temperature. According to some embodiments of invention, the mixture of two or more different substances may exhibit two or more distinct transition temperatures or a single modified transition temperature.

The liquid impervious and flexible material 12 is generally formed of a polymer. The higher the thermal conductivity of the liquid impervious and flexible material 12 the more efficient the transfer of heat in and out of the system. To increase thermal conductivity of the flexible material 12, the addition of highly conductive materials like metal particles such as silver, or graphite, or graphene or the like to the polymer defining the flexible material 12 would increase the thermal conductivity. This would further improve the heat transfer characteristics of the system. Polymers suitable for providing substrate may be any of a number of known polymers such as thermoset (crosslinked), thermosettable (crosslinkable), or thermoplastic polymers that are capable of being formed into a flexible film and are liquid impermeable, including acrylates (including methacrylates such as polymethylmethacrylate), polyols (including polyvinyl alcohols), epoxy resins, silanes, siloxanes (with all types of variants thereof), polyvinyl pyrrolidones, polyimides, polyamides, poly(phenylene sulphide), polysulfones, phenol-formaldehyde resins, cellulose ethers and esters (for example, cellulose acetate, cellulose acetate butyrate, etc.), nitrocelluloses, polyurethanes, polyesters (for example, poly (ethylene terephthalate), poly(ethylene naphthalate)), polycarbonates, polyolefins (for example, polyethylene, polypropylene, polychloroprene, polyisobutylene, polytetrafluoroethylene, polychlorotrifluoroethylene, poly (p-chlorostyrene), polyvinylidene fluoride, polyvinylchloride, polystyrene, poly α-methyl styrene, etc.), phenolic resins (for example, novolak and resole resins), polyvinylacetates, styrene/acrylonitriles, styrene/maleic anhydrides, polyoxymethylenes, polyvinylnaphthalenes, polyetheretherketones, polyaryletherketones, fluoropolymers, polyarylates, polyphenylene oxides, polyetherimides, polyarylsulfones, polyethersulfones, polyamideimides, and polyphthalamides.

By encapsulating the layer or panel including the heat absorbing material, instead of milligrams to grams of phase change material within a given layer as is currently done in the prior art, the present invention provides the capability of utilizing hundreds of grams or pounds of phase change material within a given layer without having to provide microencapsulation, which significantly reduces costs associated with the use of phase change materials. The increased amount of phase change material within a given layer can be configured to extend the effective solid to liquid or liquid to solid transition time of the phase change material throughout an entire sleep cycle of 8 hours or more, which is unlike prior art microencapsulated phase change layers that generally provide an effective transition time of a few minutes to about 30 minutes. As used herein, the term "transition time" generally refers to the time of the transition of the phase change material per unit cell volume of the phase change material during use by an end user on the mattress. For example, an end user would feel cool as the phase change material absorbs heat from the end user during the sleep cycle. In the present disclosure, the amount of phase change material within the panel at a given thickness and saturation level can be calculated to provide cooling or heating from about 30 minutes to about 8 hours or longer.

Figure 3:
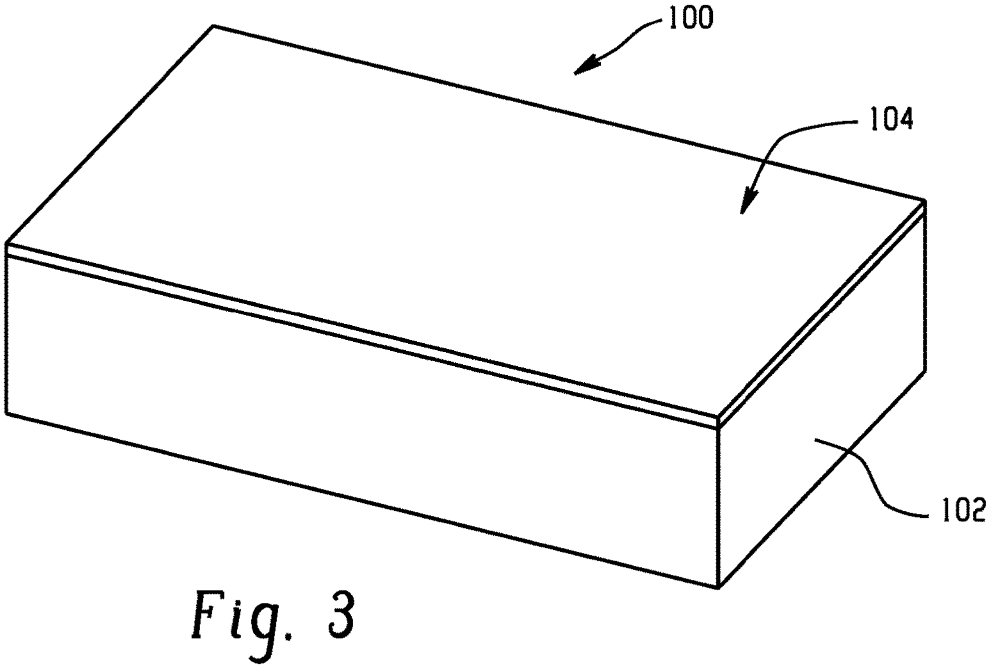
FIG. 3 schematically illustrates a perspective view of a mattress assembly including an encapsulated panel in accordance with one or more embodiments of the present invention.

FIG. 3 shows a perspective view of an exemplary mattress assembly including the encapsulated panel as described above. The mattress assembly 100 includes a base core layer 102 configured with generally planar top and bottom surfaces. For this as well as the other embodiments disclosed herein, the core layer 102 is chosen to have a thickness less than or about equal to the overall thickness of the mattress assembly. Generally, the thickness of the core layer 102 is within a range of 4 inches to 15 inches, with a range of about 6 inches to 8 inches thickness in other embodiments, and a range of about 6 to 6.5 inches in still other embodiments.

The core layer 102 can be formed of one or more layers of an open or closed cell foam including, without limitation, viscoelastic foams, non-viscoelastic foams, latex foams, polyurethane foams, and the like. In one embodiment, the core layer 102 can include a pre-stressed foam layer. That is, the foam core layer is subjected to a pre-stressing process such as disclosed in U.S. Pat. No. 7,690,096 to Gladney et al., incorporated herein by reference in its entirety. By way of example, a force can applied to at least a section of the foam core layer in an amount sufficient to temporarily compress its height so as to permanently alter a mechanical property of the foam layer to provide a pre-stressed foam layer having a firmness that is different from the firmness of a similar foam that was not pre-stressed.

The foam core layer 102 can have a density of 1 pound per cubic foot ($lb/ft^3$) to 6 $lb/ft^3$. In other embodiments, the density is 1 $lb/ft^3$ to 5 $lb/ft^3$ and in still other embodiments, from 1.5 $lb/ft^3$ to 4 $lb/ft^3$. By way of example, the density can be about 1.5 $lb/f^{t3}$. The hardness of the foam core layer, also referred to as the indention load deflection (ILD) or indention force deflection (IFD), is within a range of 20 to 45 pounds-force, wherein the hardness is measured in accordance with ASTM D-3574.

Alternatively, the core layer 102 can be an innerspring assembly. The coil springs of the innerspring assembly may be open coils or may be encased coils, e.g., pocketed (Marshall) coils. In some embodiments, the coil spring layer may further include foam. Bordering the outer row of the coil springs in the innerspring assembly is a side rail (not shown) made, for example, of foam or another suitable material known to those skilled in the art. The side rail may be perforated as may be desired in some applications.

In one or more embodiments, the encapsulated panel 104 overlays at least a portion of the core layer 102 in the case of multiple zones or completely overlay the top surface of the core layer. The encapsulated panel 104 is positioned proximate to a sleeping surface. Advantageously, the encapsulated panel 104 including the heat absorbing material provides extended cooling as needed to an end user of the mattress assembly. The encapsulated panel 104 generally has a thickness equal to or less than 1 inches in some embodiments, a thickness equal to or less than 0.75 inch in other embodiments, or a thickness equal to or less than 0.5 inches in still other embodiments.

In one or more embodiments, the mattress assembly can include multiple encapsulated panels. The multiple encapsulated panels can be placed at different depths relative to the sleeping surface to further extend the cooling effects over a longer duration. Still further, each of the multiple encapsulated panels at the different depths can be configured to provide different zones of cooling to a specific portion of the mattress, e.g., the encapsulated panel can have a dimension and placement corresponding to a lumbar region or elsewhere of the mattress when in use. The encapsulated can have the same or different thicknesses as well as the same or different heat absorbing materials and amounts therein.

It should be apparent that the encapsulated panel can include material(s) in addition to the heat absorbing material, but not limited to, surfactants, flame retardants, antibacterial agents, dyes, thermally conductive components, and/or the like. The encapsulated panel 104 has a generally planar top and bottom surface and can be sandwiched between layers proximate to the sleeping surface or can be the uppermost surface in the mattress assembly. Although the encapsulated panel is shown spanning the width and length of the mattress assembly, it should be apparent as discussed above that encapsulated panel can be configured to span a portion of the mattress assembly so as to provide one or more different zones. By way of example, which is not intended to be limiting, a encapsulated panel 104 configured for use in queen sized mattress can have a width of 59.5 inches and a length of 79.5 or span a portion thereof.

Referring back to FIG. 3, the mattress assembly may include additional layers (not shown) above or below the encapsulated panel 104 including the heat absorbing material. The various layers may be adjoined to one another using an adhesive or may be thermally bonded to one another or may be mechanically fastened to one another as may be desired for different applications.

The mattress assembly 100 can further include a side rail assembly (not shown) about all or a portion of the perimeter of the mattress assembly. The side rails included in the mattress assembly may be attached to or placed adjacent to at least a portion of the perimeter of the mattress assembly, and may include metal springs, spring coils, encased spring coils, foam, latex, natural latex, latex w/gel, gel, viscoelastic gel, or a combination, in one or more layers. The side rails may be placed on one or more of the sides of the mattress assembly, e.g., on all four sides of the mattress assembly, on opposing sides, on three adjacent sides, or only on one side of the mattress assembly. In certain embodiments, the side rails may comprise edge supports with a firmness greater than that provided by the mattress core 102. The side rails may be fastened to the mattress assembly via adhesives, thermal bonding, or mechanical fasteners.

For ease in manufacturing the mattress assembly, the side rail assembly may be assembled in linear sections that are joined to one another to form the perimeter about the mattress layers. Alternatively, the ends may be mitered or have some other shape, e.g., lock and key type shape.

In one or more embodiments, the at least one encapsulated panel is disposed under the fabric cover or quilt panel of the mattress, which is typically one of the uppermost layers of a mattress assembly. Optionally, the at least one encapsulated panel can be a removable topper layer. Advantageously, a removable top layer would allow cooling effects to be added to any existing bed. In these embodiments, high conductivity foams can be placed above and/or below the phase change material layer 104 to enhance thermal transfer. Advantageously, selective positioning of the encapsulated panel with or without the high conductivity foam layers above and/or below the phase change material layer as noted above can influence the rate of phase change, e.g., phase change from a liquid state back to a solid state after the end user has left the mattress.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mattress assembly comprising:

a single encapsulated planar panel proximate to a sleeping surface of the mattress assembly spanning at least a portion of the length and/or width of the sleeping surface and overlaying a core layer comprising:

an outer layer comprising a liquid impermeable and flexible material completely encapsulating an interior region, the interior region consisting of a layer of liquid permeable fibers saturated with hundreds of grams of a phase change material that is not microencapsulated, wherein the interior region is free from foam, wherein the phase change material in a liquid state is configured to wick into and/or fills voids within the liquid permeable fibers, and wherein the single encapsulated panel is configured to extend the effective solid to liquid or liquid to solid transition time of the phase change material throughout an entire sleep cycle of 8 hours or more.

2. The mattress assembly of claim 1, wherein the liquid permeable fibers are randomly oriented within the layer.

3. The mattress assembly of claim 1, wherein the liquid permeable fibers are vertically oriented within the layer with respect to the sleeping surface.

4. The mattress assembly of claim 1, wherein the phase change material comprises a mixture of phase change materials having different melting points.

5. The mattress assembly of claim 1, wherein the phase change material has a melting point in a range of 22° C. to 40° C.

6. The mattress assembly of claim 1, wherein the phase change material is in an amount effective to provide cooling or heating during a sleep cycle of at least one hour.

7. The mattress assembly of claim 1, wherein the encapsulated panel underlies a portion of the sleeping surface of the mattress assembly.

8. The mattress assembly of claim 1, wherein the phase change material has a latent heat of at least 40 J/g.

9. The mattress assembly of claim 1, wherein the encapsulated panel underlies a cover layer or a quilt layer within the mattress assembly.

10. The mattress assembly of claim 1, wherein the encapsulated panel is a removable layer.

11. The mattress assembly of claim 1, wherein the liquid impermeable and flexible material further comprise a thermally conductive material in an amount to increase thermal conductivity relative to other portions of the liquid impermeable and flexible material without the thermally conductive material.

* * * * *